United States Patent [19]

King

[11] 4,193,859
[45] Mar. 18, 1980

[54] SELECTIVE MULTIPLE ELECTRODE WASTE WATER TREATING SYSTEM

[76] Inventor: Arthur S. King, 8021 Cherokee La., Leawood, Kans. 66206

[21] Appl. No.: 938,439

[22] Filed: Aug. 31, 1978

[51] Int. Cl.² .................... C25B 9/00; C25B 11/04; C25B 11/12; C25B 15/08
[52] U.S. Cl. .................... 204/269; 204/272; 204/292; 204/294
[58] Field of Search .............. 204/149, 233, 269, 272, 204/294, 292

[56] References Cited

U.S. PATENT DOCUMENTS

| | | | |
|---|---|---|---|
| 3,523,891 | 8/1970 | Mehl | 204/269 X |
| 3,663,413 | 5/1972 | Marmo | 204/269 X |
| 3,692,661 | 9/1972 | Shockcor | 204/269 |
| 3,816,276 | 6/1974 | Ichiki et al. | 204/149 X |
| 4,064,033 | 12/1977 | Dekeister et al. | 204/269 X |
| 4,102,754 | 7/1978 | Hedges et al. | 204/269 X |

*Primary Examiner*—John H. Mack
*Assistant Examiner*—D. R. Valentine
*Attorney, Agent, or Firm*—Schmidt, Johnson, Hovey & Williams

[57] ABSTRACT

A plurality of individual treaters, each containing a pair of oppositely charged electrodes, are arranged circularly around a centrally disposed tank into which all of the treaters empty. A common supply manifold for all of the treaters brings waste water or other liquids into the system for treatment by any selected one of the treaters upon opening a control valve associated with such selected treater and closing control valves associated with the remaining treaters. Each treater contains an electrode that is constructed from a material differing from that of electrodes in the remaining treaters so that a particular treater may be selected for use based upon the predicted reaction of the material from which its electrode is made with the particular constituents of the waste liquid being treated. The central tank into which all treaters empty includes a pair of oppositely charged electrodes of its own to expose the once treated liquid to yet a second electric field, and there is a special structure associated with the lowermost discharge end of the electrode pair within the tank which is so arranged and configured that it reduces turbulence adjacent the floor of the tank such as to encourage settling out of floc produced by the treating process.

8 Claims, 2 Drawing Figures

SELECTIVE MULTIPLE ELECTRODE WASTE WATER TREATING SYSTEM

TECHNICAL FIELD

This invention relates to the treatment of waste liquids by electricity so as to encourage floculation and settling out of foreign substances contained within the liquid.

BACKGROUND ART

Several of my own prior patents and applications discuss the attributes of electrically treating waste liquids to encourage floculation. Moreover, it is a well-known fact that, in an electrolytic treater, electrodes made from certain materials react more favorably with certain substances contained in the liquid being treated than other materials which could be selected for the electrodes. That is, for any given substance carried by a liquid, certain materials seem to promote floculation of such substances to a greater degree than others.

In many industrial installations, the waste effluent may vary from day to day and from job to job with respect to the constituents of the effluent. However, it is commonly the case that a signle treating system must try to cope with all of the countless varieties of substances that may be presented to it for handling. As above stated, some materials perform better with regard to certain substances than others, and hence, although the system might employ one material ideally suited for a certain substance on one day, such material might not be ideal for the next day or for the next batch of waste liquid presented to the treating system.

SUMMARY OF THE PRESENT INVENTION

Accordingly, an important object of the present invention is to provide a degree of flexibility that has heretofore been lacking in prior treating systems, such flexibility providing the user with the capability of exposing the liquid to be treated to any selected one of a number of different electrode materials, depending upon the predicted reaction of the particular constituents of the liquid with the various available materials from which to choose.

Pursuant to this objective, the present invention involves arranging a number of different treaters, each employing a different electrode material for its main electrode, in such a way that all of the treaters are fed by a common supply manifold. All of the treaters empty into a common receiver of a selected type, and control valves associated with each of the treaters respectively enables the same to be opened and closed such as to selectively adapt the system for operation of any one of the treaters to the exclusion of the others. Hence, the treater containing the electrode material best suited for use with the particular constituents of the waste liquid at hand can be opened so that all flow moves through the selected treater to the exclusion of all other treaters in the system if such is desired. This results in a miximization of the floc-causing effects of such electric treaters, to the end that the liquid finally issuing from the system may contain fewer foreign substances than has heretofore been possible.

DETAILED DESCRIPTION

Figure 1:
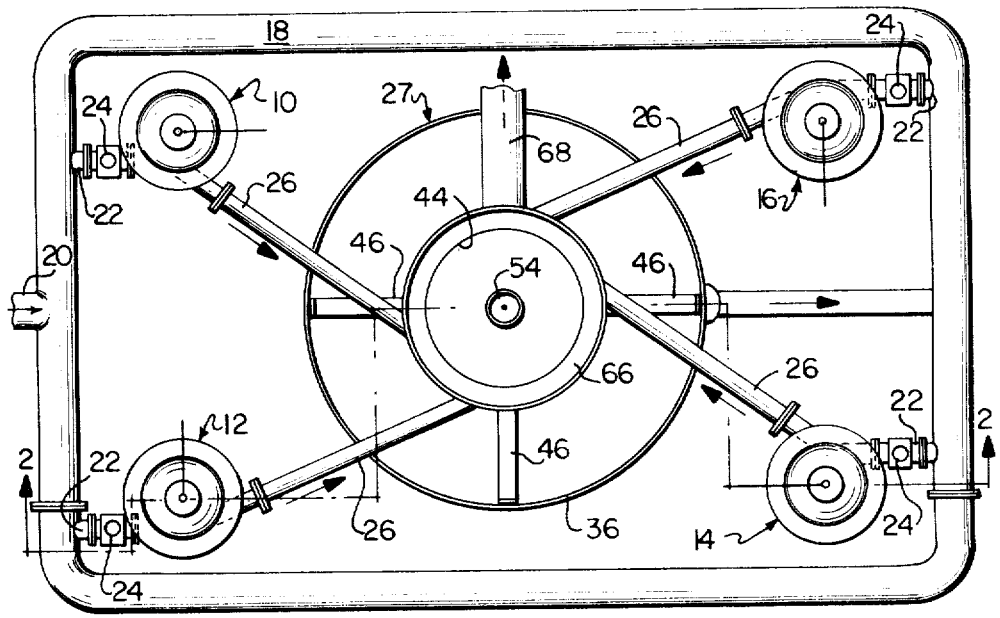
FIG. 1 is a top plan view of a multiple electrode treating system constructed in accordance with the principles of the present invention.
Figure 2:
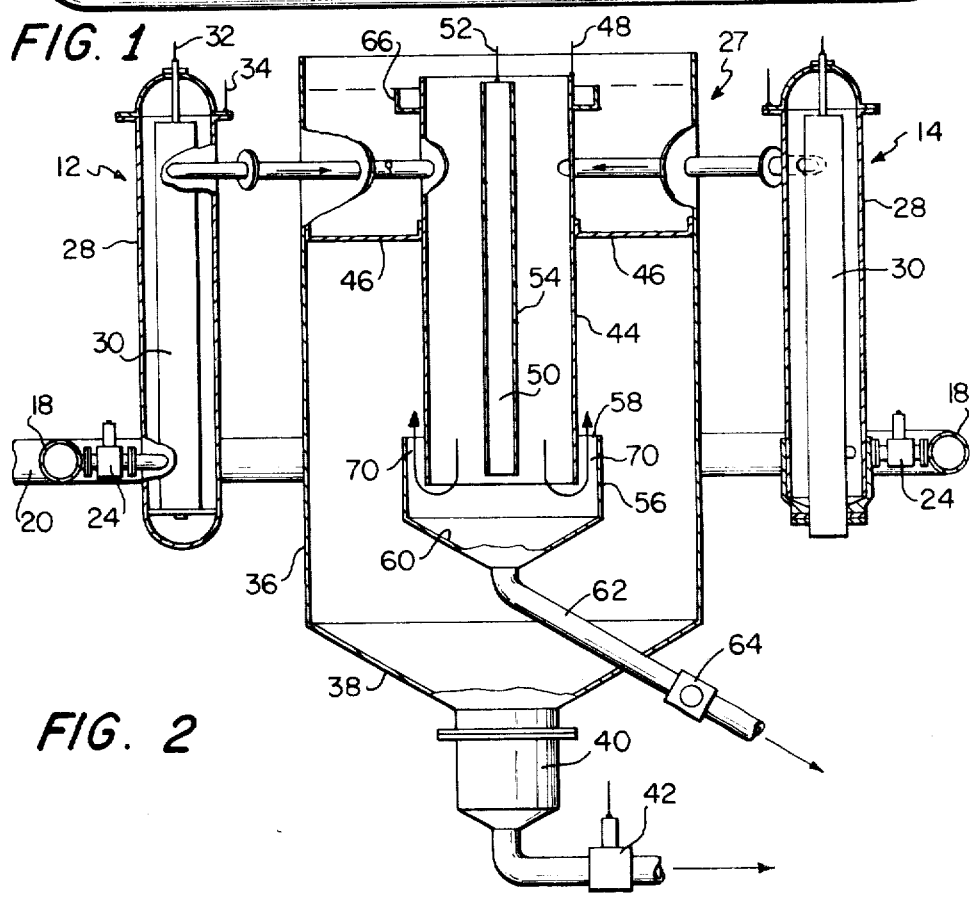
FIG. 2 is a vertical, cross-sectional view thereof taken substantially along line 2—2 of FIG. 1.

The system includes a plurality of individual treaters 10, 12, 14 and 16 whose total number may vary depending upon a number of factors such as, for example, the variety of constituents likely to be found in the liquid being treated. All of the treaters 10–16 are supplied via a common manifold 18 which is itself supplied via a conduit 20 leading from a source of liquid supply. An inlet conduit 22 for each of the treaters 10–16 respectively leads from the manifold 18 tangentially into the respective treaters 10–16 adjacent the lower ends thereof. Each of such conduits 22 is provided with a control valve 24, which may be solenoid-actuated if desired, for opening and closing the respective conduits 22.

Each of the treaters 10–16 is also provided with a tangentially disposed outlet conduit 26 adjacent its upper end, and the outlet conduits 26 all lead generally radially inwardly to a centrally disposed, common receiver broadly denoted by the numeral 27 and whose details of construction will be hereinafter described.

As exemplified by the treater 12, each of the treaters is generally tubular, having an outer wall 28 coaxially receiving an inner electrode 30. The outer wall 28 is constructed from electrically conductive material such that wall 28 may form an outer electrode of the treater in opposition to the inner electrode 30. The two electrodes 28 and 30 are connected across a source of electrical potential via leads 32 and 34.

The outer electrodes 28 of the treaters 10–16 are normally constructed from iron or steel. On the other hand, the inner electrodes 30 are, pursuant to the present invention, constructed from any one of several different materials. For example, the electrode 30 of treaters 14 may be constructed from carbon while the remaining electrodes 30 of the treaters 10, 12 and 16 may be constructed from materials selected from the group containing iron, magnesium, lead, copper and platinum. It is to be understood, of course, that only one of such materials is selected per electrode.

Parenthetically, it should be noted that the construction for the treater 14 has been illustrated as being slightly different than the construction for the treater 12, particularly with respect to the way in which the two inner electrodes 30 of the treaters are supported. This, however, has no bearing on the principles of the present invention.

The receiver 27 includes a centrally disposed, upright tank 36 having conical, centrally converging and downwardly sloping floor 38. An outlet 40 from the tank 36 is controlled by a valve 42 which may be solenoid-actuated if such is desired.

The tank 36 is open at its uppermost end and coaxially receives an upright cylinder 44 of reduced diameter relative to the tank 36. Cylinder 44 is open at its upper and lower ends and is supported within the tank 36 by any suitable means such as the supporting arms 46. The cylinder 44 is metalic and is connected via a lead 48 to one side of a source of electrical potential (not shown), there being an inner electrode 50 received within the housing 44 in coaxially disposed, inwardly spaced relationship therewith which is connected via a lead 52 to the opposite side of said source of electrical potential. Preferably, the inner electrode 50 has a dielectric skin 54 around the same such as to avoid direct contact between the electrode 50 and the liquid within the housing 44. This is a contrast to the preferred arrangement for the treaters 10–16 wherein each inner electrode 30 is preferably bare and thus fully exposed to the liquid flowing therethrough. Hence, the treaters 10–16 are effectively electrolytic treaters while the housing 44 and inner electrode 50 become an electrostatic treater within which there is no flow of electrical current.

The lower discharge end of the cylinder 44 is received within structure in the form of a cup 56 of enlarged, diametrical dimensions relative to the cylinder 44 such that there is an annular space 58 between the side wall of the cup 56 and the proximal portions of the cylinder 44. The cup 56 has a downwardly converging, generally conical bottom 60 provided with an outlet conduit 62 controlled by a valve 64 which may be solenoid-actuated. The outlet conduit 62 may be connected to the supply conduit 20 or directly to the manifold 18 if such is desired for recirculation purposes.

The upper end of the cylinder 44 carries an overflow weir 66 annularly circumscribing the cylinder 44 to receive discharging liquid from the surrounding tank 36 and floating floc from the upper end of the cylinder 44. A trough 68 located slightly below the uppermost extremity of the weir 66 extends radially therefrom through and beyond the wall of the tank 36 to a settling basin or the like (not shown).

In use, waste liquid such as water containing foreign substances is introduced to the system from the supply conduit 20. The liquid fills the manifold 18 so as to be available to all of the treaters 10–16, but it is contemplated that only one of such treaters 10–16 will be operational at any one point in time, although it is still possible by keeping the appropriate valves 24 opened to operate two or more of the treaters 10–16 concurrently if such is desired.

In this regard, selecting which of the treaters 10–16 to be operational at any one time depends upon the nature of the constituents contained within the incoming liquid. If the incoming liquid has the greatest tendency to form floc when exposed to a carbon electrode, for example, the valves 24 associated with the treaters 10, 12 and 16 are all closed while the valve 24 associated with the treater 14 is open. This causes the liquid within the manifold 18 to flow only into the treater 14 for exposure to the carbon electrode 30.

If, on the other hand, the liquid contains a substance which exhibits its greatest floc-forming characteristics when exposed to some other material than carbon, then the proper one of the treaters 10–16 has its valve 24 open while the valves 24 of all others are closed.

The treated liquid leaves the treater 10, 12, 14 or 16 via the corresponding outlet conduit 26 and tangentially enters the annular chamber within the cylinder 44 where it is exposed to the electric field established between the cylinder 44 and the inner electrode 50. The liquid swirls around the inner electrode 50 inside of the cylinder 44, and floc that may be formed during this process having a specific gravity less than that of the liquid contained within the cylinder 44 rises to the top surface of the liquid as floating floc, whereupon it may spill over into the weir 66 and be exhausted therefrom via the trough 68.

The liquid within the cylinder 44 also leaves the same via the lower discharge end thereof as indicated by the arrows 70. Without the presence of the cup 56, such departing liquid would essentially discharge straight down toward the floor 38 of the tank 36, hence causing a degree of turbulence in the lower portion of the tank 36 and disturbing any floc which may have settled out of the liquid along the floor 38. Because of the presence of the cup 56, however, the discharging flow from the lower end of the cylinder 44 is diverted upwardly as illustrated away from the floor 38 so as to avoid such undesirable turbulence.

The primary liquid discharge from the receiver 27 is via the weir 66 and the trough 68 as the liquid level rises in tank 36 and overflows into weir 66. However, it may from time to time be necessary to remove accumulated floc from the floor 38 of the tank 36, and at such times, it is only necessary to open the valve 42 such that the accumulated floc and inherently some of the overhead liquid will flush from the tank 36 via outlet 40. Likewise, floc will undoubtedly also settle out to some extent along the bottom 60 of the cup 56, and hence, periodically, the valve 64 may be opened to remove accumulated floc from the cup 56 via the outlet conduit 62, along with some of the liquid within the tank 36.

I claim:

1. An effluent treatment system for liquids containing foreign substances comprising:
   a plurality of separate treaters, each including a pair of opposed, oppositely charged electrodes exposed to the liquid as it passes through the treater,
   each treater having at least one of its electrodes constructed from a different material than either of the electrodes of other treaters of the plurality of treaters;
   a liquid supply manifold common to all of said plurality of treaters;
   a receiver common to all of said treaters for reception of liquid therefrom after treatment; and
   control means operable to open and close liquid flow communication between said manifold and each individual treater to permit treatment of the liquid by a selected one of the treaters according to the nature of the particular substance carried by the liquid and its predicted reaction with the particular materials from which the various electrodes are constructed.

2. A treatment system as claimed in claim 1, wherein one of said treaters includes a carbonaceous electrode and another of said treaters includes an electrode constructed from a material selected from the group containing iron, magnesium, lead, copper and platinum.

3. A treatment system as claimed in claim 1, wherein said receiver includes a pair of opposed, oppositely charged electrodes for further treating the liquid after it has passed through a selected treater.

4. A treatment system as claimed in claim 1, wherein said receiver includes a tank having a floor upon which floc may settle out of the liquid, said receiver further including an upright cylinder within said tank and provided with an open, lowermost discharge end, said cylinder being disposed to receive treated liquid from the selected treater at a point spaced above said discharge end, said receiver further including structure across said discharge end for diverting liquid issuing therefrom away from said floor of the tank to minimize disturbance of the settling floc.

5. A treatment system as claimed in claim 4, wherein said structure includes a cup receiving said discharge end of the cylinder in diametrically spaced relationship thereto, said cup having a bottom spaced below said discharge end.

6. A treatment system as claimed in claim 5, wherein said cup is provided with a drain outlet therefrom.

7. A treatment system as claimed in claim 5, wherein the opposite, uppermost end of said cylinder is also open to permit liquid discharge therefrom, said tank having outlet means associated therewith for removing treated liquid from the tank.

8. A treatment system as clamed in claim 5, wherein said cylinder comprises one electrode of a pair of oppositely charged electrodes within the tank, the other electrode of the pair being disposed concentrically within said cylinder.

* * * * *